March 14, 1967  G. A. DOTTO  3,308,873
VENETIAN BLIND OPERATION

Filed April 20, 1965  2 Sheets-Sheet 1

INVENTOR
GIANNI A. DOTTO
BY
Robert Gueme
ATTORNEY

March 14, 1967     G. A. DOTTO     3,308,873

VENETIAN BLIND OPERATION

Filed April 20, 1965     2 Sheets-Sheet 2

INVENTOR
GIANNI A. DOTTO
ATTORNEY

United States Patent Office 3,308,873
Patented Mar. 14, 1967

3,308,873
VENETIAN BLIND OPERATION
Gianni A. Dotto, Dayton, Ohio, assignor to P. R. Mallory & Co. Inc., Indianapolis, Ind., a corporation of Delaware
Filed Apr. 20, 1965, Ser. No. 449,547
5 Claims. (Cl. 160—176)

The present invention relates to means and methods for discriminatingly moving an adjustable device such as Venetian blinds and more particularly relates to a differential for automatically opening and closing such a device.

The need for a device which will be able to operate from a designated null point to move in a positive and its opposite direction and automatically control adjustable devices such as Venetian blinds has been apparent if such a device would be made in an economical and efficient manner. Such devices would then be able to cooperate with other sensing devices so as to effectively control the movement of cooperating auxiliary equipment. For example, in a light sensitive device the pickoff from a sensing device would operate so as to activate the present means to drive cooperating objects either to open or close a pair of blinds. The device operates so that an input thereto will move the internal components thereof in a direction defined by a null point, said null point determining the to and fro movement of associated equipment.

It is an object of the present invention to provide a device for automatically opening and closing auxiliary equipment such as Venetian blinds.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking the present invention provides a differential for automatically opening and closing Venetian blinds which is actuated by two electric motors. The first of said motors is continually driven from an A.C. power source such as an electric socket in houses. The second motor, also driven by the power supply, is actuated by the control circuit. A paddle is rotatably mounted on the drive shaft of the differential so that the rotational motion is translated into vertical motion thereby adjusting the strap which opens and closes the Venetian blind.

Figure 1:
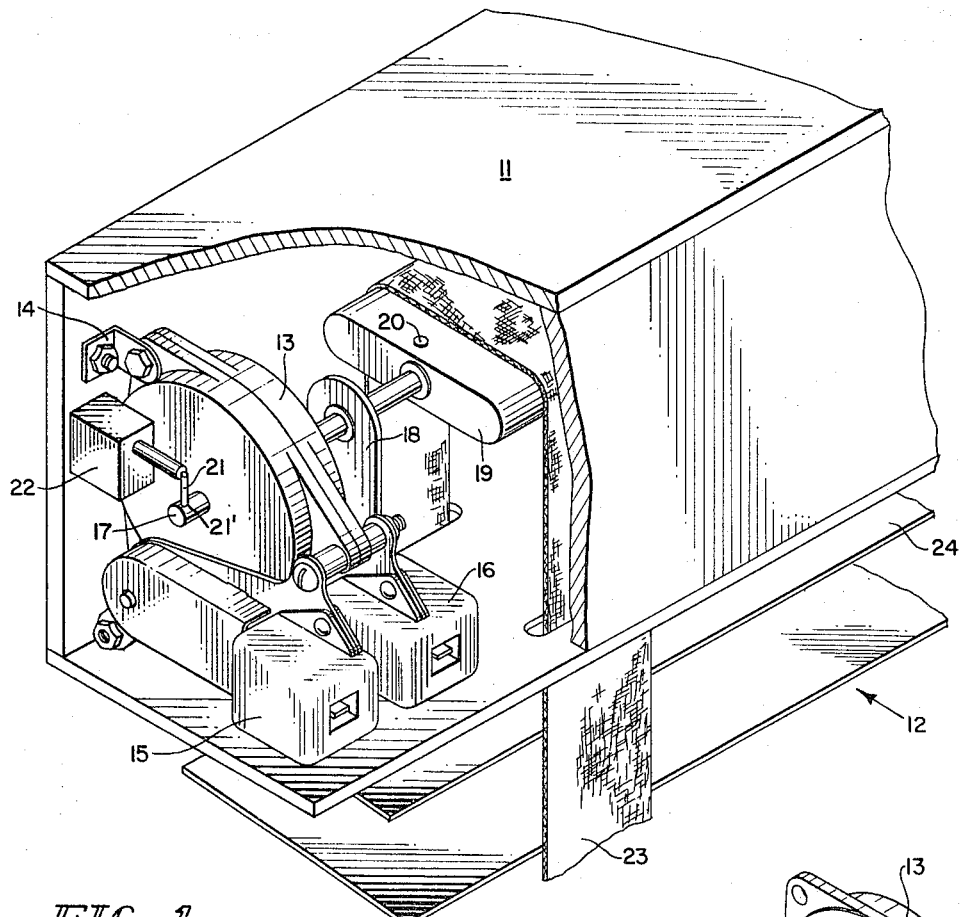
FIGURE 1 is a cut away view of the top housing of the Venetian blind showing the motor driven differential and its relationship to the Venetian blind.

For a fuller understanding of the present invention, reference will now be made to the drawings. In FIGURE 1 differential 10 is mounted in top housing 11 of Venetian blind 12 by support bracket 14 which secures differential housing 13 to a back wall of housing 11. There are two motors associated with differential 10, motor 15 which operates in a clockwise motion and motor 16 which operates in a counterclockwise direction.

Motor 16 operates approximately 50 times the speed of motor 15. Motor 15 serves to slowly open blind 12; but since the speed of motor 16 is much greater, when photoelectric cell 50 (FIG. 5) is actuated, motor 16 overcomes the inertia of motor 15 and rapidly closes Venetian blind 12.

Drive shaft 17 has pin 21 at a first end which actuates switch 22. Drive shaft 17 is supported by shaft support 18 and a second end terminates in paddle 19 and is secured thereto by pin 20. As drive shaft 17 rotates, paddle 19 translates the rotational motion of the shaft into vertical motion thereby changing the position of strap 23 to either open or close slats 24 of Venetian blind 12.

Figure 2:
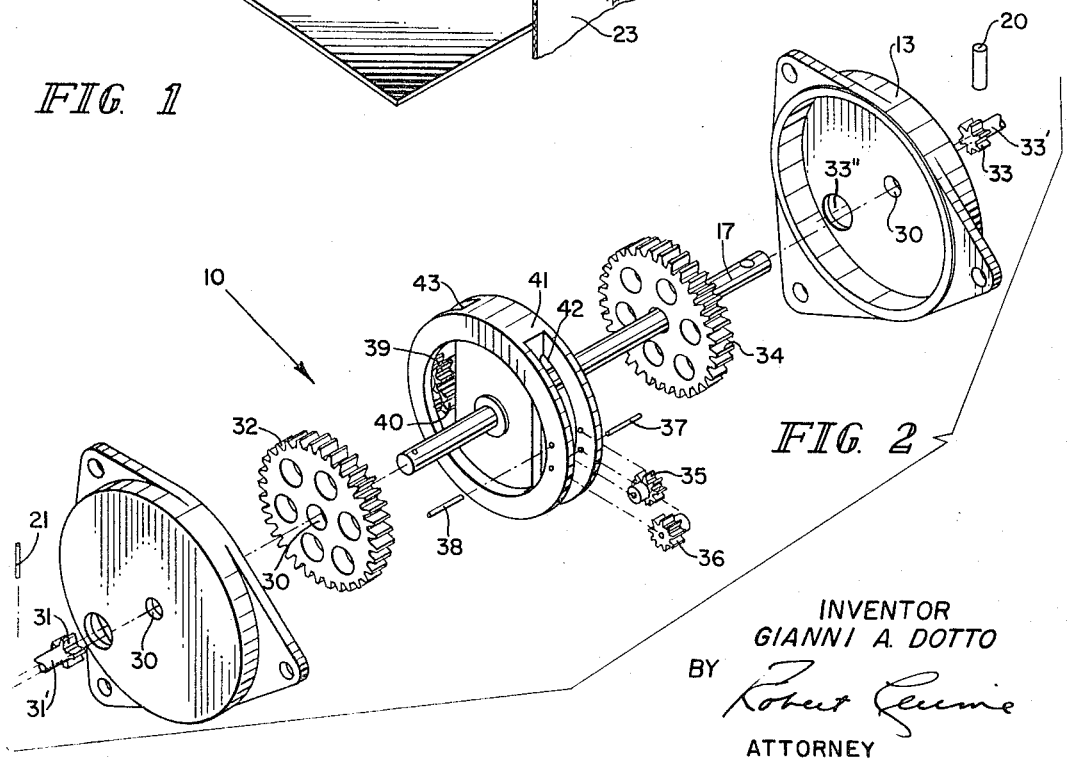
FIGURE 2 is an exploded view of the differential.

FIGURE 2 is an exploded view of the differential 10 showing the interrelation of the various parts. Pinion gear 31 engages gear 32 and is driven by motor 15. Pinion gear operates through aperture 31″ of the housing and has shaft 31′ engaging the motor. Similarly, pinion gear 33 engages gear 34 and is driven by motor 16. The gear is connected to the motor by shaft 33′ and operates through aperture 33″. The numeral 30 designates the aperture in housing 13, gears 32 and 34 through which the drive shaft operates. Housing 41 is press fitted with shaft 17 so that when rotational motion is imparted to housing 41, shaft 17 is also rotated.

Pin 20 secures paddle 19 to drive shaft 17 and fits in aperture 20′ of drive shaft 17. Pin 21 operates switch 22 and fits in drive shaft 17 in aperture 21′.

Motor 15 is constantly in operation until the Venetian blind is completely open. At that time, switch 22 cuts it off. Gear 32 is driven by pinion 31 in a counterclockwise direction. When motor 16 is actuated, pinion gear 33 drives gear 34 in a clockwise direction. Gear 34 has pinion gears 35 and 40 cooperating therewith. Gears 35 and 40 are held securely in housing 41 so that they may rotate in position about pins 38 and 38′ respectively. Gear 32 has pinion gears 36 and 39 cooperating therewith which are securely held in housing 41 by pins 37 and 37′ respectively. Gears 35 and 36 are constantly in mesh with each other and gears 39 and 40 are constantly in mesh with each other. Since gear 34 operates approximately 50 times faster than gear 32, the motion of gear 32 is essentially stopped when gear 34 is actuated. Pinion gears 35 and 40 then rotate in a counterclockwise direction and engage pinion gears 36 and 39 which operate in a clockwise direction. As gear 32 is stationary, gears 36 and 39 tend to walk around the periphery of gear 32 thereby imparting rotational motion to housing 41 and shaft 17, which in turn impart vertical motion to paddle 19 and close the Venetian blind.

Figure 3:
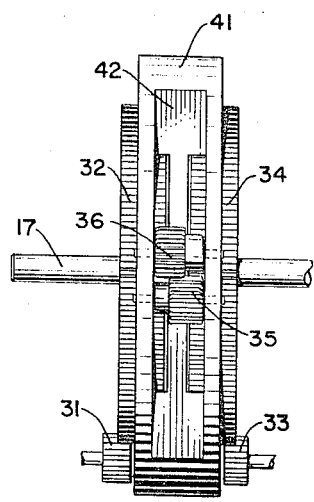
FIGURE 3 is an end view of the gear housing.
Figure 4:
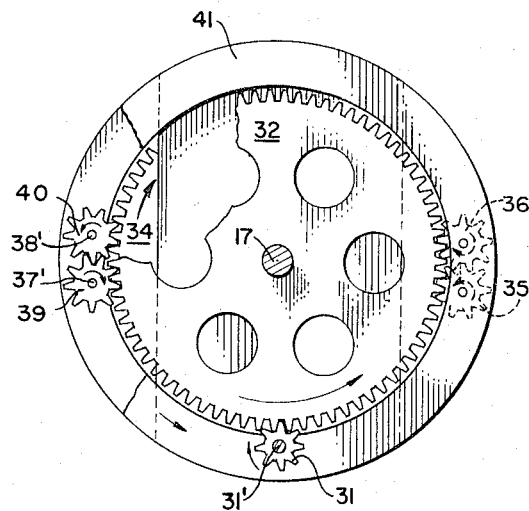
FIGURE 4 is a sectional view of the gear housing.

In FIGURES 3 and 4 the gear assembly is clearly shown. Pinion 33 is in mesh with gear 34 which is in mesh with pinion gears 35 and 40. Pinion 31 is in mesh with gear 32 which is in mesh with pinion gears 36 and 39. Pinions 39 and 40 are in mesh with each other as are pinions 35 and 36. The gears are assembled in housing 41 which has slots 42 and 43 to facilitate assembly.

Figure 5:
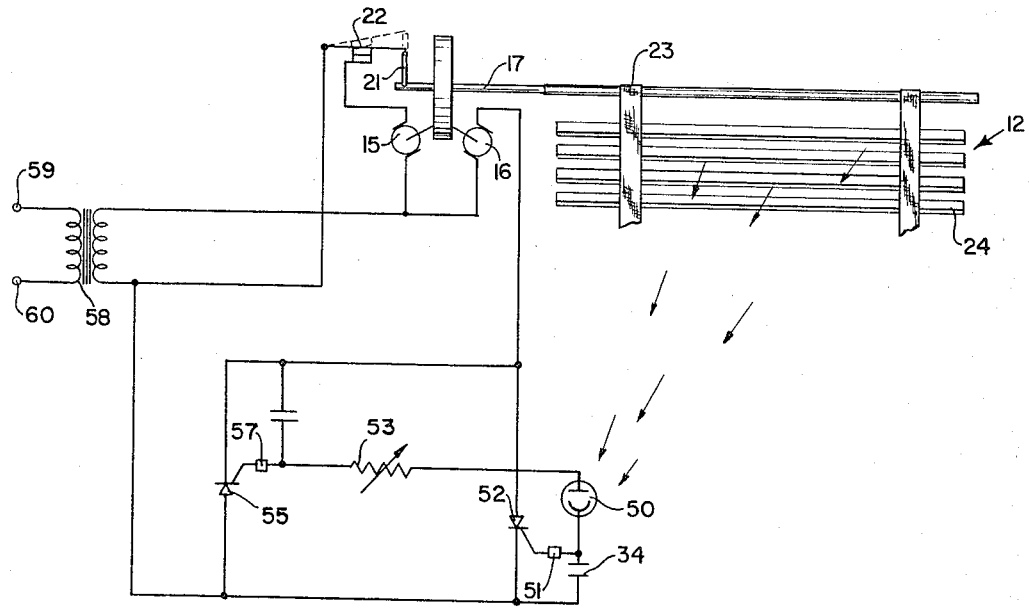
FIGURE 5 is a schematic diagram of the fundamental control circuit employed in the present invention.

Referring now to FIGURE 5, when both electric motors are stopped, the Venetian blind is normally open. Motor 16 is at rest when no light source hits photocell 50 and so the resistance between firing devices 51 and 52 is too great to fire the two SCR 52 and 55 before the end of every half cycle. That is, when the blinds are opened or the sunlight is not intense enough to trigger photocell 50. Motor 15 is stopped because a contact switch 22 is interrupted by a pin 21 which is located in a specific position on the differential shaft.

At the beginning of the cycle, assume a sunlight source hits photocell 50. The control circuit immediately actuates motor 16 whose purpose is to close the Venetian blind. At the same time pin 21 releases counterswitch 22 and motor 15 is actuated and rotates in the opposite direction of motor 16. The two synchronous motors 15 and 16 have a speed rotation in r.p.m. of approximately 50:1. In this condition, even if both motors are actuated, because of the differing speeds, the differential shaft 17 has a tendency to immediately close the Venetian blind thereby cutting off the light source, namely the sunlight.

Variable resistor 53 is adjusted so that when the sunlight is interrupted either by clouds, closing of the blind, etc., electric motor 16 stops. This means normal daylight foot-candle is low enough to operate photocell 50.

Motor 15 continues to operate but at a low speed. For example if the closing of the Venetian blind takes a period of 30 seconds, to reopen it will take at least 25 minutes. In so doing as long as the sunlight goes through the Venetian blind, motor 16 always overcomes motor 15. When there is no possibility of the Venetian blind being hit by the sunlight, motor 15 will be in continuous motion up to the moment when the Venetian blind is completely open. At this point, pin 21 will interrupt electric switch 22 and motor 15 will be stopped.

It must be understood that photocell 50 will be set in a position behind the Venetian blind and the Venetian blind in this case acts as a light diaphragm. Transformer 58 is necessary to transform the house electric voltage to a 12 volt A.C. This is in accord with U.L. specifications and approval to eliminate any possibility of electric shock.

The present invention has a wide scope of applications and as hereinabove described and in its representative embodiment is merely illustrative and not exhaustive in scope. Since many widely differing embodiments of the invention may be made without departing from the scope thereof, it is intended that all matters contained in the above description and shown in the accompanying drawing shall be interpreted as illustrative and not in a limiting sense.

Having thus described my invention, I claim:

1. In a device for automatically opening and closing a Venetian blind, the combination comprising: a Venetian blind including a plurality of slats and a paddle retained in substantially spaced parallel relationship by strap means, differential gearing means, first and second driving means having their respective outputs connected to said differential gearing means, said first driving means imparting motion to said differential gearing means in a counterclockwise direction, said second driving means imparting motion to said differential gearing means in a clockwise direction, a shaft fixedly connected to and driven by said differential gearing means and connected to said paddle of said Venetian blind, said differential gearing means displacing said shaft in a clockwise or a counterclockwise direction at a speed which is the difference between the motion imparted to said differential gearing means by said first and said second drive means, said shaft displacing said paddle, said paddle and said strap translating said rotational motion of said shaft to vertical motion thereby opening and closing said slats of said Venetian blind, pin means carried by and rotatable with said shaft, and a switch means actuated by said pin means after determined displacement of said shaft in said counterclockwise direction so as to de-energize said first drive means.

2. In a device for automatically opening and closing a Venetian blind, the combination comprising: a Venetian blind including a plurality of slats and a paddle retained in substantially spaced parallel relationship by strap means, differential gearing means, first and second driving means having their respective outputs connected to said differential gearing means, said first driving means imparting motion to said differential gearing means in a counterclockwise direction, said second driving means imparting motion to said differential gearing means in a clockwise direction, a shaft fixedly connected to and driven by said differential gearing means and connected to said paddle of said Venetian blind, said differential gearing means displacing said shaft in a clockwise or a counterclockwise direction at a speed which is the difference between the motion imparted to said differential gearing means by said first and said second drive means, said shaft displacing said paddle, said paddle and said strap translating said rotational motion of said shaft to vertical motion thereby opening and closing said slats of said Venetian blind, pin means carried by and rotatable with said shaft, a switch means actuated by said pin means after determined displacement of said shaft in said counterclockwise direction so as to de-energize said first drive means, and control means actuated by a determined condition energizing said second drive means so as to drive said differential gearing means and said shaft in said clockwise direction, said pin disengaging said switch means thereby energizing said first driving means as said shaft is driven in said clockwise direction.

3. In a device for automatically opening and closing a Venetian blind, the combination comprising: a Venetian blind including a plurality of slats and a paddle retained in substantially spaced parallel relationship by strap means, differential gearing means, first and second driving means having their respective outputs connected to said differential gearing means, said first driving means imparting motion to said differential gearing means in a counterclockwise direction, said second driving means imparting motion to said differential gearing means in a clockwise direction, a shaft fixedly connected to and driven by said differential gearing means and connected to said paddle of said Venetian blind, said differential gearing means displacing said shaft in a clockwise or a counterclockwise direction at a speed which is the difference between the motion imparted to said differential gearing means by said first and said second drive means, said shaft displacing said paddle, said paddle and said strap translating said rotational motion of said shaft to vertical motion thereby opening and closing said slats of said Venetian blind, pin means carried by and rotatable with said shaft, a switch means actuated by said pin means after determined displacement of said shaft in said counterclockwise direction so as to de-energize said first drive means, and light actuated control means energizing said second drive means so as to drive said differential gearing means and said shaft in said clockwise direction when light impinging on said control means exceeds a determined value, said pin means disengaging said switch means thereby energizing said first driving means as said shaft is driven in said clockwise direction.

4. In a device for automatically opening and closing a Venetian blind, the combination comprising: a Venetian blind including a plurality of slats and a paddle retained in substantially spaced parallel relationship by strap means, differential gearing means including a housing, two pairs of spaced apart pinion means carried by said housing, each pinion of said pair of pinion means meshing with each other, two gear means, one of said gear means meshing with and driving one pinion of each pair of pinion means, another of said gear means meshing with and driving the remaining pinion of each pair of pinion means, said gear means and said pinion means cooperating to rotatably drive said housing, first and second driving means having their respective outputs connected to said differential gearing means, said first driving means imparting motion to said housing of said differential gearing means in a counterclockwise direction, said second driving means imparting motion to said housing of said differential gearing means in a clockwise direction, a shaft fixedly connected to and driven by said housing of said differential gearing means and connected to said paddle of said Venetian blind, said housing of said differential gearing means displacing said shaft in a clockwise or a counterclockwise direction at a speed which is the difference between the motion imparted to said differential gearing means by said first and said second drive means, said shaft displacing said paddle, said paddle and said strap translating said rotational motion of said shaft to vertical motion thereby opening and closing said slats of said Venetian blind, pin means carried by and rotatable with said shaft, a switch means actuated by said pin means after determined displacement of said shaft in said counterclockwise direction so as to de-energize said first drive means, and light actuated control means energizing said second drive means so as to drive said differential gearing means and said shaft in said clockwise direction when light impinging on said control means exceeds a determined value, said pin means disengaging said switch means thereby energizing said first driving means as said shaft is driven in said clockwise direction.

5. In a device for automatically opening and closing a Venetian blind, the combination comprising: a Venetian blind including a plurality of slats and a paddle retained in substantially spaced parallel relationship by strap means, differential gearing means including a housing, at least two pairs of spaced apart pinion means carried by said housing, each pinion of said pair of pinion means meshing with each other, two gear means, one of said gear means meshing with and driving one pinion of each pair of pinion means, another of said gear means meshing with and driving the remaining pinion of each pair of pinion means, said gear means and said pinion means cooperating to rotatably drive said housing, first driving means connected to one of said gear means imparting motion to said housing of said differential gearing means in a counterclockwise direction, second driving means connected to the other of said gear means imparting motion to said housing of said differential gearing means in a clockwise direction, a shaft fixedly connected to and driven by said housing of said differential gearing means and connected to said paddle of said Venetian blind, said housing of said differential gearing means displacing said shaft in a clockwise or a counterclockwise direction at a speed which is the difference between the motion imparted to said differential gearing means by said first and said second drive means, said shaft displacing said paddle, said paddle and said strap translating said rotational motion of said shaft to vertical motion thereby opening and closing said slats of said Venetian blind, pin means carried by and rotatable with said shaft, a switch means actuated by said pin means after determined displacement of said shaft in said counterclockwise direction so as to de-energize said first drive means, and light actuated control means energizing said second drive means so as to drive said differential gearing means and said shaft in said clockwise direction when light impinging on said control means exceeds a determined value, said pin means disengaging said switch means thereby energizing said first driving means as said shaft is driven in said clockwise direction.

References Cited by the Examiner

UNITED STATES PATENTS

| | | | |
|---|---|---|---|
| 3,177,367 | 4/1965 | Brown | 160—5 X |
| 3,204,690 | 9/1965 | Nyc | 160—176 |
| 3,214,999 | 11/1965 | Lapp | 74—675 |
| 3,218,887 | 11/1965 | Flynn | 74—675 |

REINALDO, P. MACHADO, *Primary Examiner.*

HARRISON R. MOSELEY, *Examiner.*

P. M. CAUN, *Assistant Examiner.*